(12) United States Patent
Amsterdam et al.

(10) Patent No.: US 7,779,140 B2
(45) Date of Patent: *Aug. 17, 2010

(54) METHOD AND SYSTEM FOR SWITCHING MEDIA STREAMS IN A CLIENT SYSTEM AS DIRECTED BY A CONTROL SYSTEM

(75) Inventors: Jeffrey David Amsterdam, Marietta, GA (US); Christopher Eythan Holladay, Marietta, GA (US); Ryan Lynch Whitman, Sunny Side, GA (US)

(73) Assignee: International Business Machines Corporation, Armonk, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/048,257

(22) Filed: Mar. 14, 2008

(65) Prior Publication Data

US 2009/0235318 A1    Sep. 17, 2009

(51) Int. Cl.
*G06F 15/16* (2006.01)
(52) U.S. Cl. .................. 709/231; 709/221; 709/230; 709/233
(58) Field of Classification Search ......... 709/220–221, 709/217–219, 223–226, 230–233; 725/86–87
See application file for complete search history.

(56) References Cited

U.S. PATENT DOCUMENTS

| | | | | |
|---|---|---|---|---|
| 6,415,326 B1 * | 7/2002 | Gupta et al. | ................. | 709/231 |
| 6,735,633 B1 * | 5/2004 | Welch et al. | ................. | 709/233 |
| 6,876,668 B1 * | 4/2005 | Chawla et al. | ............... | 370/468 |
| 6,910,078 B1 * | 6/2005 | Raman et al. | ............... | 709/231 |
| 7,254,605 B1 * | 8/2007 | Strum | ......................... | 709/203 |
| 7,257,641 B1 * | 8/2007 | VanBuskirk et al. | ......... | 709/238 |
| 7,430,222 B2 * | 9/2008 | Green et al. | ................. | 370/486 |
| 2002/0133247 A1 * | 9/2002 | Smith et al. | .................... | 700/94 |
| 2003/0055995 A1 * | 3/2003 | Ala-Honkola | ............... | 709/231 |
| 2003/0061371 A1 * | 3/2003 | Deshpande | ................. | 709/232 |
| 2003/0163520 A1 * | 8/2003 | Bussani et al. | .............. | 709/203 |
| 2004/0025186 A1 * | 2/2004 | Jennings et al. | ............... | 725/93 |
| 2004/0172478 A1 * | 9/2004 | Jacobs et al. | ................. | 709/233 |
| 2005/0021804 A1 * | 1/2005 | Hameleers et al. | .......... | 709/231 |
| 2005/0120128 A1 * | 6/2005 | Willes et al. | ................. | 709/232 |
| 2005/0172028 A1 * | 8/2005 | Nilsson et al. | .............. | 709/231 |
| 2005/0237931 A1 * | 10/2005 | Punj et al. | ..................... | 370/229 |
| 2007/0005791 A1 * | 1/2007 | Goulden et al. | ............. | 709/231 |
| 2008/0155055 A1 * | 6/2008 | Shan et al. | ................... | 709/217 |
| 2009/0150943 A1 * | 6/2009 | Vasudevan et al. | ............ | 725/86 |

\* cited by examiner

*Primary Examiner*—Faruk Hamza
(74) *Attorney, Agent, or Firm*—Schmeiser, Olson & Watts; Anna L. Linne

(57) ABSTRACT

A method and system for switching media streams of a video in a client system. The media streams are made available to the client system by a content providing system. A first media stream received from the content providing system is played in a SHOW mode in the client system. A command is received from a control system to execute a procedure for deciding whether to switch from playing the first media stream to playing a second media stream which has a different media stream bandwidth than the first media stream. The executed procedure decides to make the switch. The switch is made to playing the second media stream in the SHOW mode as the second media stream is being received from the content providing system in response having been requested from the content providing system. The switching preserves content continuity of the video.

20 Claims, 7 Drawing Sheets

METHOD AND SYSTEM FOR SWITCHING MEDIA STREAMS IN A CLIENT SYSTEM AS DIRECTED BY A CONTROL SYSTEM

RELATED APPLICATION

The present application is related to U.S. patent application Ser. No. 12/046,486, filed, Mar. 12, 2008 and entitled "METHOD AND SYSTEM FOR SWITCHING VIDEO STREAMS IN A CLIENT SYSTEM BASED ON ENVIRONMENTAL CHANGES"

FIELD OF THE INVENTION

The present invention discloses a method and system for switching video streams in a client system.

BACKGROUND OF THE INVENTION

In current practice, as content providers seek to provide more high-quality video to users over the Internet, the content providers quickly find that high bandwidth live streams distributed to many simultaneous users can lead to very high bandwidth cost. There are a number of different solutions to limit the bandwidth usage of multiple high-quality streams that are currently in use. However, each of these solutions has drawbacks. One popular method is to provide a "waiting room" where users basically have to wait their turn to see the video. A drawback to this method is that it limits the number of users who can see the video at once and reduces the overall user experience. Another method is to ask the users if they are still watching the video after a set timeout period and disconnect the users who do not respond. This again degrades the user experience by popping up messages to the user.

There is a need for a method and system that overcomes or mitigates the aforementioned shortcomings of current practice of providing video to users.

SUMMARY OF THE INVENTION

The present invention provides a method for switching media streams of a video in a client system, said media streams being made available to the client system by a content providing system, said method comprising:

receiving a first media stream of the video from the content providing system;

playing the first media stream in a SHOW mode in the client system as the first media stream is being received;

during said playing the first media stream, receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, executing the procedure;

deciding from said executing the procedure to make the switch;

after said deciding, switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by a media application in the client system.

The present invention provides a process for supporting computer infrastructure, said process comprising providing at least one support service for at least one of creating, integrating, hosting, maintaining, and deploying computer-readable code in a computing system, wherein the code in combination with the computing system is configured to perform a method for switching media streams of a video in a client system comprised by the computing system, said media streams being made available to the client system by a content providing system, said method comprising:

receiving a first media stream of the video from the content providing system;

playing the first media stream in a SHOW mode in the client system as the first media stream is being received;

during said playing the first media stream, receiving a command from a control system to activate executing a procedure for deciding whether to male a switch from playing the first media stream to playing a second media stream of the video, said command identifying the second media stream which has a different media stream bandwidth than the first media stream;

responsive to said receiving the command, executing the procedure;

deciding from said executing the procedure to make the switch;

after said deciding, switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by a media application in the client system.

The present invention provides a computer program product, comprising a computer usable storage medium having a computer readable program code stored therein, said computer readable program code containing instructions that when executed by a processor of a computer system implement a method for switching media streams of a video in a client system comprised by the computer system, said media streams being made available to the client system by a content providing system, said method comprising:

receiving a first media stream of the video from the content providing system;

playing the first media stream in a SHOW mode in the client system as the first media stream is being received;

during said playing the first media stream, receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, executing the procedure;

deciding from said executing the procedure to make the switch;

after said deciding, switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by a media application in the client system.

The present invention provides a computer system comprising a processor and a computer readable memory unit coupled to the processor, said memory unit containing instructions that when executed by the processor implement a method for switching media streams of a video in a client system comprised by the computing system, said media streams being made available to the client system by a content providing system, said method comprising:

receiving a first media stream of the video from the content providing system;

playing the first media stream in a SHOW mode in the client system as the first media stream is being received;

during said playing the first media stream, receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, executing the procedure;

deciding from said executing the procedure to make the switch;

after said deciding, switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by a media application in the client system.

The present invention provides a method and system that overcomes or mitigates shortcomings of current practice of providing video to users.

DETAILED DESCRIPTION OF THE INVENTION

A "video" includes a time-ordered sequence of images which may appear in frames. A video may also comprise audio content synchronized with its included images. Thus a video comprises image content alone or both image content and audio content. A "media stream" associated with a video is a signal being streamed along a transmission path, wherein the signal comprises content from the video in accordance with a content modality. For a video having both image content and audio content, its associated media stream may be in one of several content modalities: an image-audio modality if the media stream comprises both the image content and audio content of the video; an image-only modality if the media stream comprises the image content but not the audio content of the video; or audio-only modality if the media stream comprises the audio content but not the image content of the video. For a video having image content but no audio content, its associated media stream must be in an image-only modality.

A "video source" generates or otherwise provides a video. A media stream associated with a video may originate from a video source and be ultimately delivered to a user system which presents the content of the media stream to a user, enabling the user to experience the video visually and/or audibly depending on the content modality (i.e., image-audio modality, image-only modality, or audio-only modality) of the associated media stream.

A media stream is characterized by a "bandwidth" denoting a maximum rate at which the data in the media stream can be transmitted (e.g., in units of bits per second or bytes per second) over its transmission path.

Figure 1:
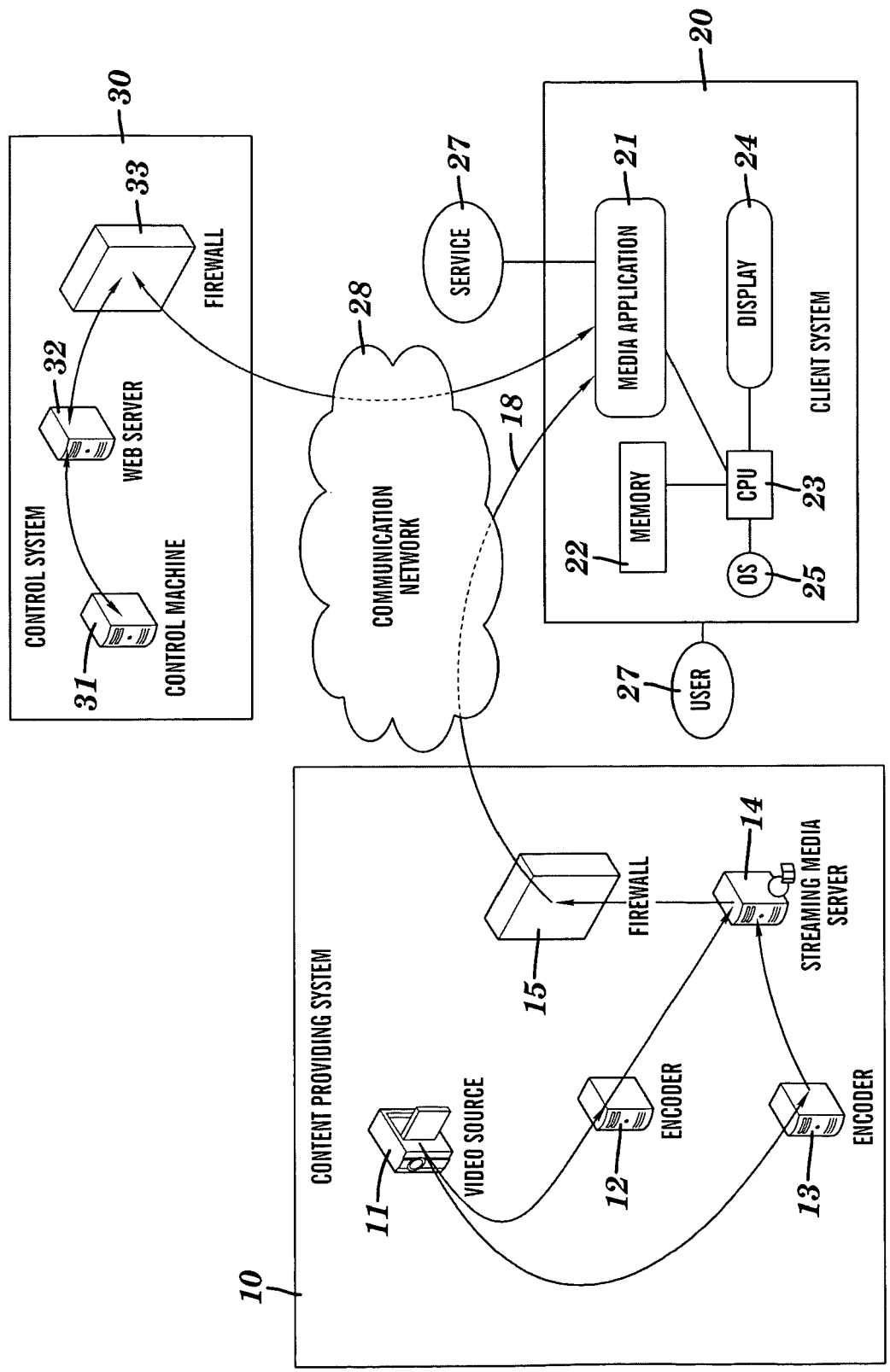
FIG. 1 depicts a client system receiving video from a content provider system via a communication network, in accordance with embodiments of the present invention.

FIG. 1 depicts a client system 20 receiving video from a content provider system 10 via a communication network 28, in accordance with embodiments of the present invention. In one embodiment, the communication network 28 is the Internet.

The content provider system 10 comprises a video source 11, an encoder 12, an encoder 13, a streaming media server 14, and a firewall 15. The encoders 12 and 13 each encode the content of the media stream by techniques known in the art that include, inter alia, image compression and audio compression. Although the content provider system 20 depicts only encoders 12 and 13, the content provider system 20 generally comprise a plurality of encoders which encode media streams of different bandwidth. For example, the encoder 12 may encode a high bandwidth media stream and the encoder 13 may encode a low bandwidth media stream.

Video is provided by the video source 11 and an associated video stream is passed into an encoder (e.g., encoder 12 or encoder 13) and passes out of the encoder, into the streaming media server 14, through the firewall 15 and into the client system 20 via the communication network 28. This resultant video stream 18 is received by the client system 20. Although the content provider system 10 is depicted in FIG. 1 with the streaming media server 14 therein for providing streaming image content, or streaming image and audio content, to the client system 20, in one embodiment the streaming media server 14 is not present in content provider system 10. Although the content provider system 10 is depicted in FIG. 1 with the firewall 15 therein for protecting against illegal unauthorized access and/or interception of the video stream provided by the video source 11, in one embodiment the firewall 15 is not present in the content provider system 10.

The client system 20 comprises a media application 21, a display 24, a processor 23 (e.g., a central processing unit (CPU)), a memory 22, and an operating system 25. The processor 23 is coupled to the media application 21, the display 24, the processor 23, and the memory 22. The media application 21 processes the media stream 18 and displays the media stream 18 to a user of the client machine 20 on the display 24. The client system 20 may be a computer system in a form of a data processing system, a television system, etc. A service 27 connected to the media application 21 will be discussed infra. The client system 20 is configured to have a user 29 view and/or hear the video and/or audio of the media stream 18.

FIG. 1 also depicts a control system 30 which comprises a control machine 31, a web server 32, and a firewall 33. The control machine 31 of the control system 30 is configured to send a command to the media application 21 of the client system 20, via the web server 32 and firewall 33, to switch from a media stream currently being played by the client system 20 to another media stream provided by the content providing system 10. The control system 30 may also receive feedback signals from the client system 20 which enables the control system 30 to be aware of and monitor the actions of the client system 20 with respect to the playing of one or more media streams by the client system 20. Although the control system 30 is depicted in FIG. 1 with the firewall 33 therein for protecting against illegal unauthorized access and/or interception of a signal comprising the command intended for the client system 20, in one embodiment the firewall 33 is not present in the control system 30.

A process of switching media streams begins with the media application 21 loading a configuration file in the memory 22. The configuration file designates a specific default media stream to be initially played in a SHOW mode on the display 24. A SHOW mode is defined as a mode in which all visual and audio attributes of the media stream being played are presented to the user 29 at the client system 20. Then the media application 21 listens for a command from the control system 30 to switch to a new media stream. The sending of the command to the media application 21 may be implemented in a number of different ways. In one embodiment, the command may be embedded in a file. In one embodiment, the media application 22 may request a file or use a real-time messaging protocol in order to receive the command from the control system 30. Switching media streams of a video in accordance with embodiments of the present invention enables video to be provided to the user system 20 in an efficient manner that is convenient for a user of the client system 20.

Once the media application 21 has received a command to switch media streams and decides to switch media streams based on satisfying a pertinent client system requirement, the media application 21 initiates a loading of the new media stream in a HIDE mode. A HIDE mode is defined as a mode in which the media stream that is being played in the client system 20 is muted and visually unavailable to the user 29 at the client system 20. In other words, the user 29 is unable to experience a media stream being played in the HIDE mode.

The new media stream to be switched from the default media stream may be designated by the command from the content providing system 10. Timecodes distributed in each media stream identify relative time along the timeline of each media stream. Thus, timecodes with equal values in both media streams identify the same relative time in the timeline of the media stream being played, or equivalently the same frame in the frames comprises by the video.

After the new stream has begun playing in the HIDE mode, the media application 21 begins to check the timecodes distributed in both media streams until the media application 21 finds a timecodes in the new media stream being played in the HIDE mode that matches (within a specified tolerance) a timecode of the current media stream (e.g., default media stream) being played in the SHOW mode. Once this matching timecode is found, the media application 21 stops the current media stream and switches the new media stream into the SHOW mode, which unmutes and males the new media stream visible and audible to the user 29.

If the media application 21 is not able to locate a matching timecode (within a specified tolerance) and within a specified time period, possibly due to network congestion and buffering, the media application 21 may pause the current media stream until the media application 21 finds a new stream timecode matching the paused stream timecode. The media application 21 may then continue by switching to the new media stream from the HIDE mode to the SHOW mode. In this embodiment, the user 29 would experience a pause in the video steam being played in the SHOW mode, similar to a buffering event. However, the user 29 would not experience any loss of content continuity in the video.

Figure 2:
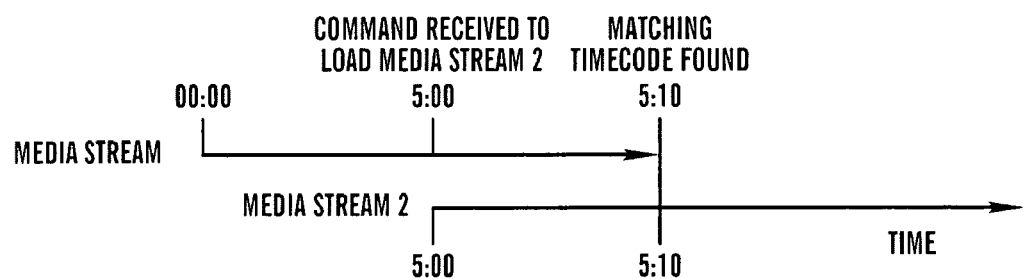
FIGS. 2 and 3 depict media stream switching scenarios, in accordance with embodiments of the present invention.
Figure 3:
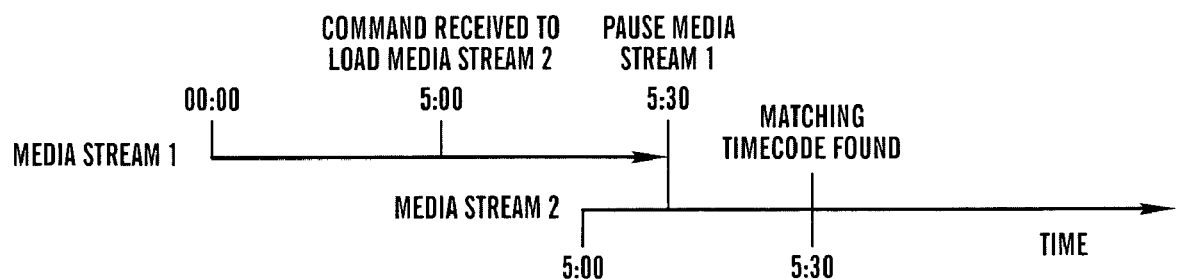

FIGS. 2 and 3 depict media stream switching scenarios, in accordance with embodiments of the present invention.

In FIG. 2, media stream 1 is playing in the SHOW mode and the media application 21 receives a command to switch media streams at a 5 minute timecode mark within the streams. The media application 21 then starts playing media stream 2 in the HIDE mode. Once media stream 2 has finished buffering and started playing, the media application 21 begins to check the timecodes in media streams 1 and 2. The media application 21 finds matching timecodes at 5 minutes 10 seconds at which time media application 21 makes media stream 2 visible and unmuted by switching media stream 2 into the SHOW mode and also stops the playing of media stream 1.

In FIG. 3, the timecodes for media stream 2 are behind the timecodes for media stream 1, which means that media stream 2 is lagging the media stream 1 with respect to their respective content. In this situation, the media application 21 pauses media stream 1 until stream 2 catches up and matching timecodes are found at 5 minutes 30 seconds.

Figure 4:
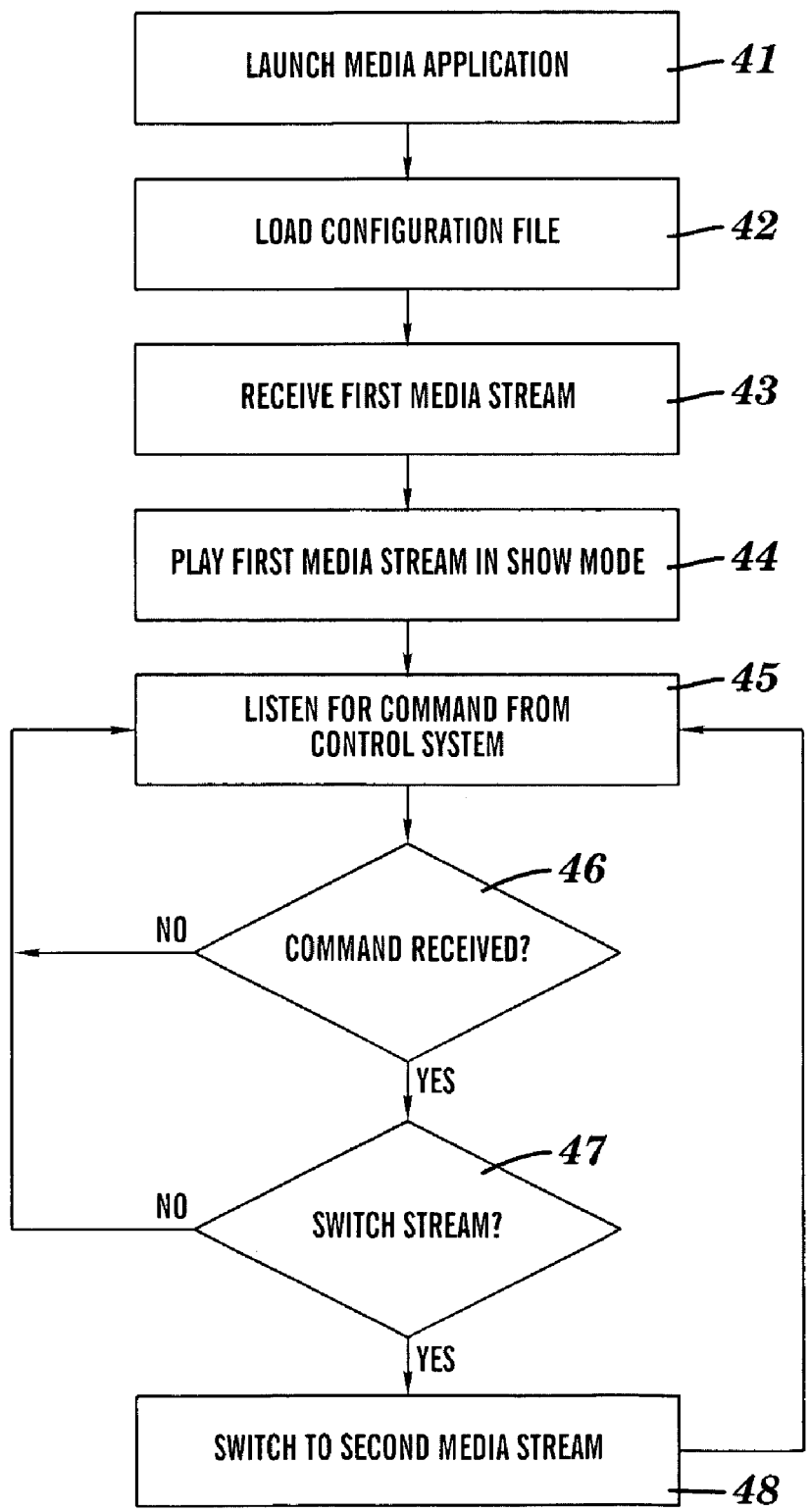
FIG. 4 is a flow chart depicting a method for switching media streams of a video in a client system, in accordance with embodiments of the present invention.

FIG. 4 is a flow chart depicting a method for switching media streams of a video in the client system 20, in accordance with embodiments of the present invention. The media streams are made available to the client system 20 by the content providing system 10. The method of FIG. 4 is performed by the media application 21 of the client system 20 in steps 41-48.

Step 41 launches the media application 21 in the client system 20.

Step 42 loads into the memory 22 a configuration file that designates a specific media stream to be initially played in the client system 20 as a default media stream, which is denoted as a first media stream.

Step 43 receives the first media stream from the content providing system 10.

Step 44 plays the first media stream in the SHOW mode via the display 24.

Step 45 listens for a command from the control system 30 to decide whether to male a switch from playing the first media stream to playing a second media stream of the video wherein the second media stream differs from the first media stream with respect to a media stream bandwidth.

The command may identify the second media stream in any manner, such as by specifying an identifier of the second media stream.

Alternatively, the command may identify a group or class of media streams from which a specific second media stream could be selected by the user system 20 or the content providing system 10. The group or class of media streams comprises a plurality of media streams. Thus in one embodiment the user system 20 selects the second media stream from the identified group or class of media streams. In another embodiment the content providing system 10 selects the second media stream from the identified group or class of media streams after the user system 20 requests that the content providing system 10 provide a second media stream from the identified group or class of media streams.

Step 46 determines whether the command has been received by the media application 21. If step 46 determines that the command has not been received by the media application 21, then the method loops back to step 45 to continue listening for a command; otherwise the command has been received and step 47 is next performed.

Step 47 performs execution of a procedure for deciding whether to make the switch from playing the first media stream to playing the second media stream. The execution of step 47 is described in more detail in FIG. 5, discussed infra. If the procedure performed by step 47 decides not to make the switch, then the method loops back to step 45 to listen for another command; otherwise step 48 is next performed.

Step 48 switches from playing the first media stream in the SHOW mode to playing the second media stream in the SHOW mode as the second media stream is being received from the content providing system 10, in response to the second media stream having been requested from the content providing system 10 by the client system 20. The switching preserves content continuity, which means that there is essentially no omission of content of the video displayed in the SHOW mode as a result of the switching. In one embodiment, the switching is performed seamlessly in time in a manner that preserves time continuity of presenting the video to the user 29 in the SHOW mode, as in the example of FIG. 2 described supra. In one embodiment, the switching is performed with a pause in time in the playing of the video in the SHOW mode, as in the example of FIG. 3 described supra. The execution of step 48 is described infra in more detail in FIGS. 6 and 7 in accordance with the examples of FIGS. 2 and 3 respectively.

After step 48 is executed, the method loops back to step 45 to listen for another command to switch to a next new media stream, wherein the prior second media stream is now designated as the first media stream with respect to subsequent execution of steps 45-48, and the next new media stream to be switched to is designated as the second media stream with respect to subsequent execution of steps 45-48.

The content providing system 10 may initiate a stream change for any number of reasons. One of these reasons may be to meet a budget restraint. If the content providing system 10 projects that its veiwership of user systems at the current bitrate will exceed bandwidth restrictions or estimates, the command issued by the content providing system 30 can instruct the user system 20 to switch the first media stream to a second media stream of lower bandwidth stream to mitigate excessive bandwidth costs. In one embodiment, the command issued by the content providing system 30 can instruct the user system 20 to switch the first media stream to a second media stream of higher bandwidth stream for any useful purpose, such as to provide the video at a higher transmission rate to the user system 20.

Figure 5:
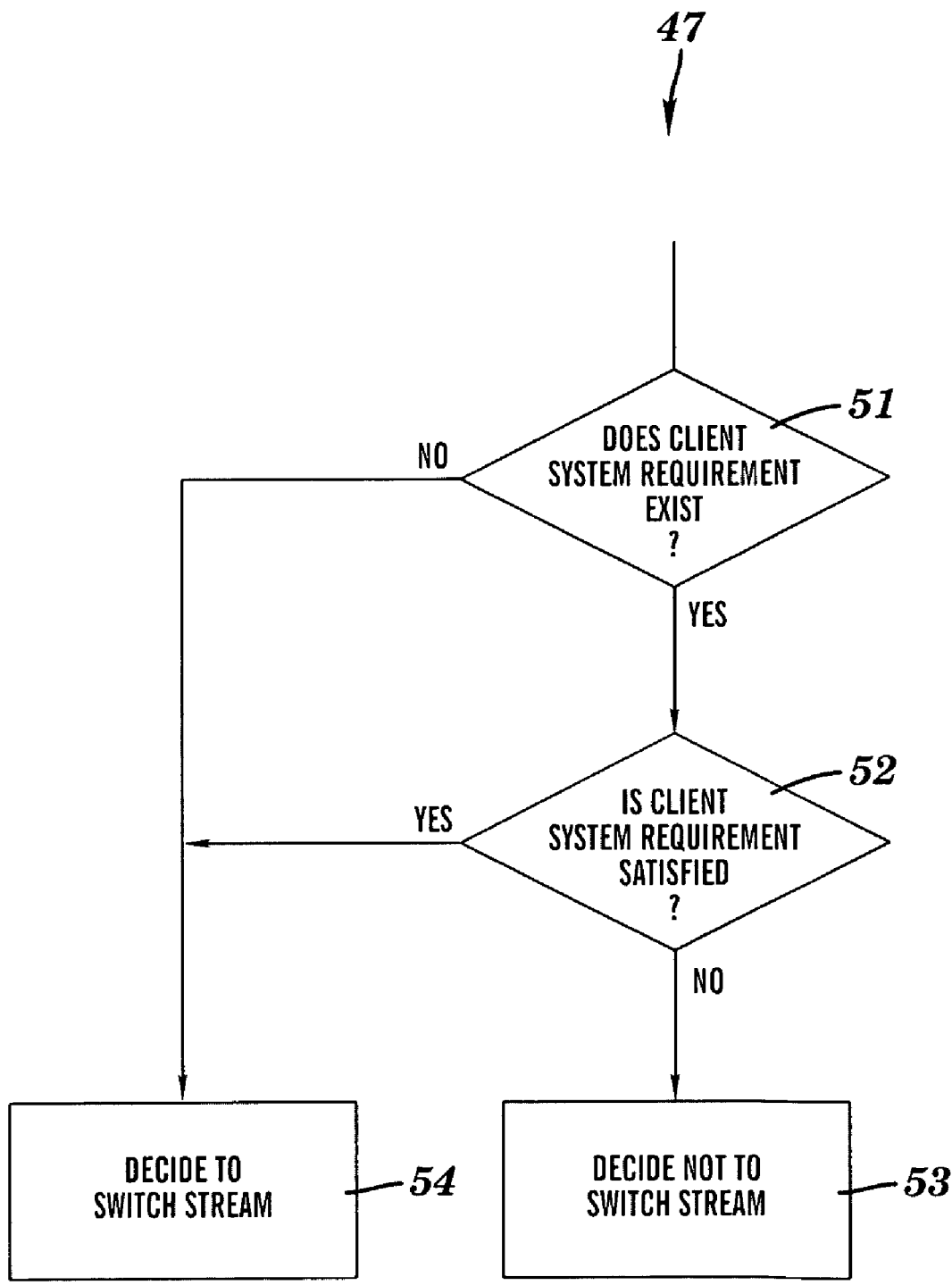
FIG. 5 is a flow chart depicting a procedure for a step in FIG. 4 of deciding whether to make a media stream switch, in accordance with embodiments of the present invention.

FIG. 5 is a flow chart depicting a procedure for step 47 in FIG. 4 of deciding whether to make the switch from playing the first media stream to playing the second media stream, in accordance with embodiments of the present invention. The flow chart of FIG. 5 comprises steps 51-54.

Step 51 determines whether there is a special requirement that must be satisfied by the client system 20 as a necessary condition for switching media streams. In one embodiment, the command to switch media streams comprises the special requirement.

A first example of such a special requirement is that the client system 20 is in a pre-designated geographical area (i.e., within any geographical area of a pre-designated at least one geographical area) such as one or more cities, one or more states, etc. In one embodiment, the geographical area may be determined by the location of a sports event (e.g., football, baseball, etc.), wherein the home state or region of the two teams may not be affected; however, the content providing system 10 can decide to constrain the media stream to any uninvolved state or region.

A second example of such a special requirement is that a client identifier (ID) that identifies the client system 20 is a member of a pre-specified group of client identifiers. For example, a client ID may be useful in a tiered subscription model. A user system that is a free subscriber to a video service may be issued a client ID that contains the properties of stream bitrate reduction, while a user system that is a premium subscriber to a video service would be issued a client ID that would prevent or limit the stream reduction.

In one embodiment, the media stream switch has been determined to result in improved reception of the video by the client system 20 and the client ID evidences that the client system has previously agreed to pay an agreed-upon extra fee for each occurrence of such a media stream switch resulting in the improved reception of the video by the client system 20.

In one embodiment, the media stream switch has been determined to result in degraded reception of the video by the client system 20 and the client ID evidences that the client system has previously agreed to be paid an agreed-upon fee as compensation for each occurrence of such a media stream switch resulting in the degraded reception of the video by the client system 20.

A third example of such a special requirement results from the content providing system 10 initiating an increase in stream bandwidth across the entire veiwership of user systems based on any number of reasons (e.g., to provide higher density video to the entire veiwership).

If step 51 determines that there is no special requirement, then step 54 is next executed and decides to switch streams; otherwise step 52 is next executed.

Step 52 determines whether the client system 20 satisfies the special requirement. In the example discussed supra in which the special requirement is that the client system 20 is within any geographical area of a pre-designated geographical area, the service 27 (see FIG. 1) may utilize a Global Positioning System (GPS), an Internet based geolocation service, etc. to determine the geographic location of the client system 20 for determining whether the client system 20 satisfies the special requirement.

If step 52 determines that there the client system 20 satisfies the special requirement, then step 54 is next executed and decides to switch streams; otherwise step 53 is next executed and decides to not switch streams.

Figure 6:
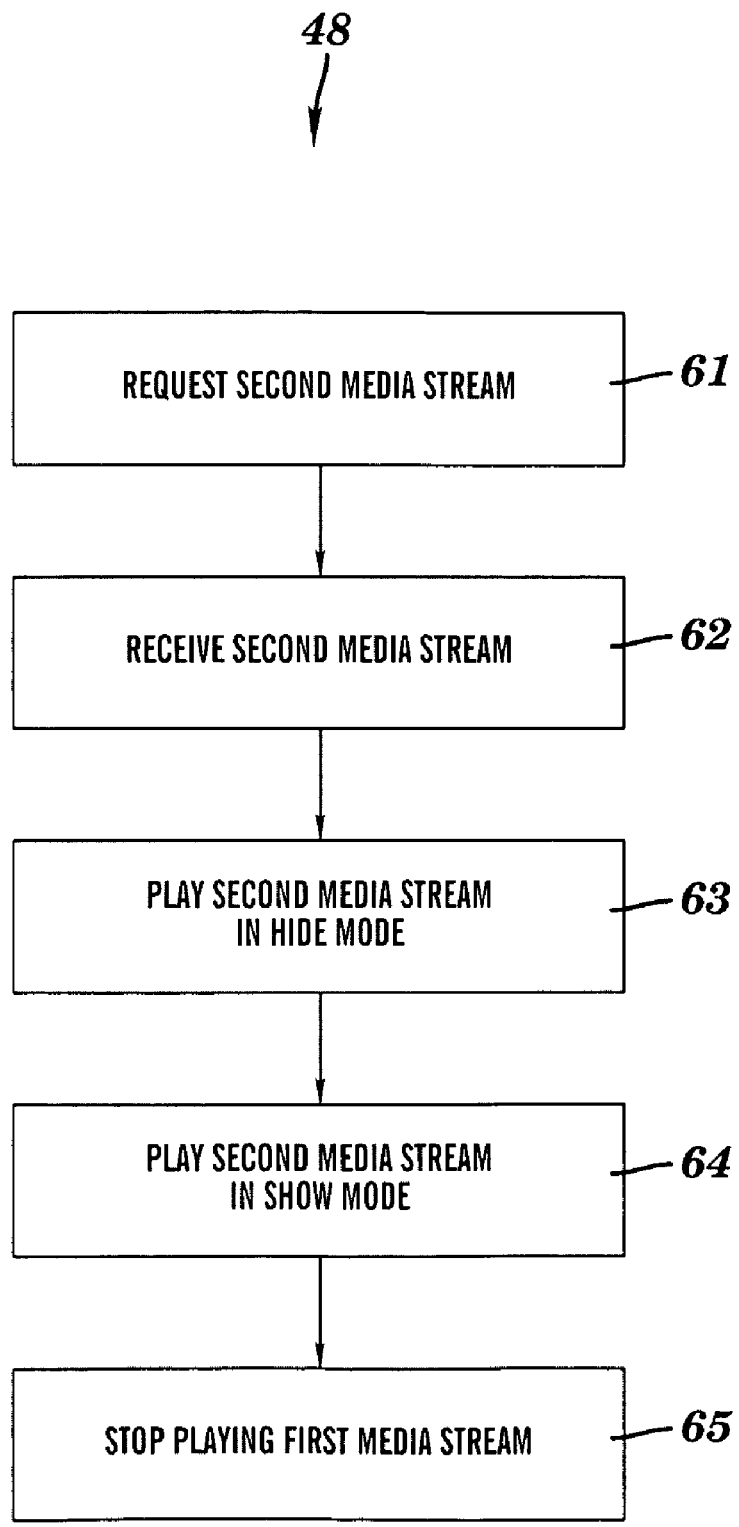
FIG. 6 is a flow chart depicting a first exemplary procedure for a step in FIG. 4 of making a media stream switch, in accordance with embodiments of the present invention.

FIG. 6 is a flow chart depicting a first exemplary procedure for step 48 in FIG. 4 of switching from playing the first media stream to playing the second media stream, in accordance with embodiments of the present invention. The flow chart of FIG. 6 is in accordance with the example depicted in FIG. 2 and comprises steps 61-65.

In step 61, the media application 21 requests a second media stream from the content providing system 10.

In step 62, the client system 20 receives the requested second media stream such that the first and second media streams are being received concurrently with respect to their respective content.

In step 63, the media application 21 plays the second media stream in the HIDE mode while the second media stream is being received and while the first media stream continues to be played in the SHOW mode.

In step 64, at a subsequent real time corresponding to a matching timecode (within a specified tolerance) in the first and second media stream, a transition is implemented from playing the second media stream in the HIDE mode to playing the second media stream in the SHOW mode.

In step 65, playing the first media stream is stopped, about simultaneous with performance of step 64 of initiating playing the second media stream in the SHOW mode.

Figure 7:
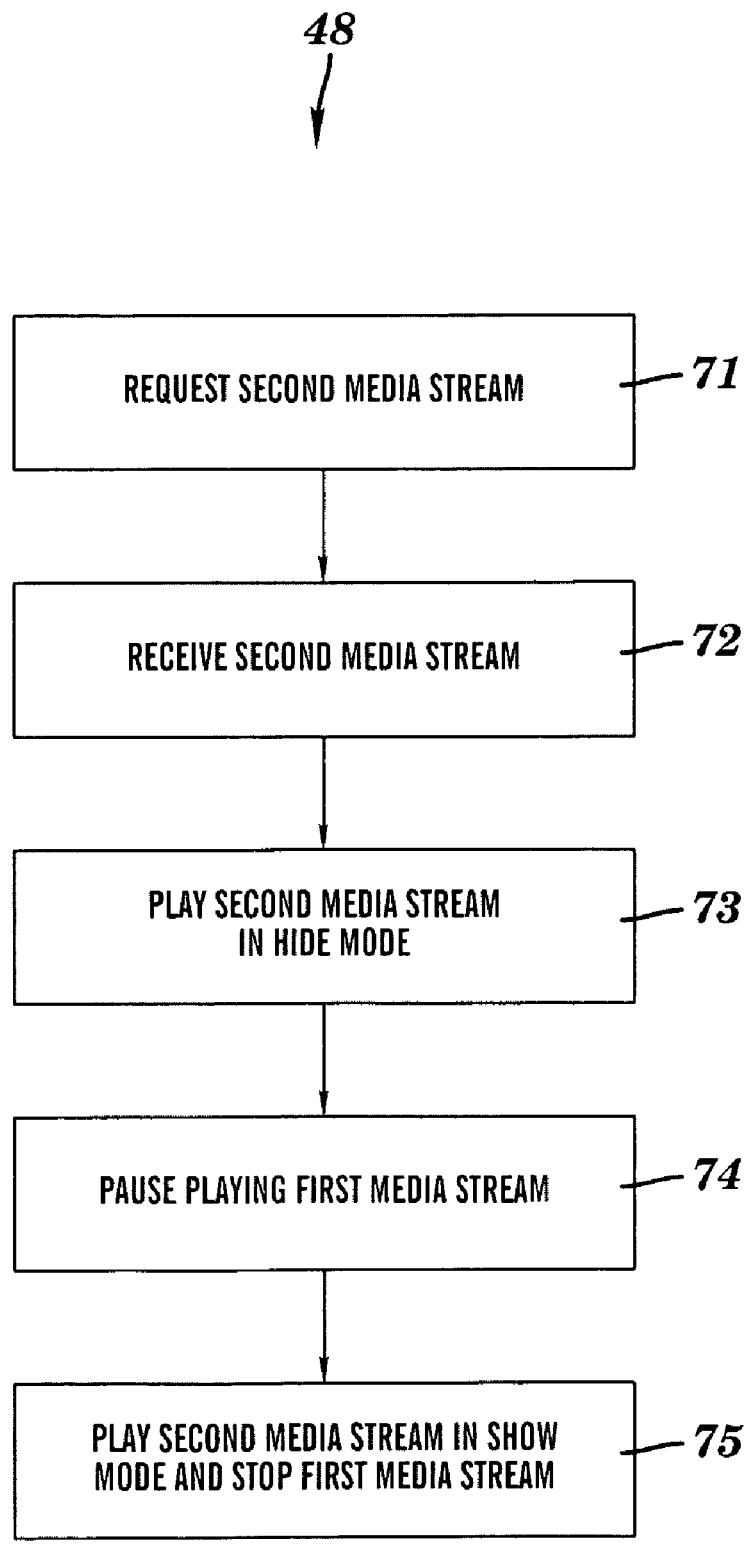
FIG. 7 is a flow chart depicting a second exemplary procedure for a step in FIG. 4 of making a media stream switch, in accordance with embodiments of the present invention.

FIG. 7 is a flow chart depicting a second exemplary procedure for step 48 in FIG. 4 of switching from playing the first media stream to playing the second media stream, in accordance with embodiments of the present invention. The flow chart of FIG. 7 is in accordance with the example depicted in FIG. 3 and comprises steps 71-75.

In step 71, the media application 21 requests a second media stream from the content providing system 10.

In step 72, the client system 20 receives the requested second media stream such that the second media stream is lagging the first media stream with respect to their respective content.

In step 73, the media application 21 plays the second media stream in the HIDE mode while the second media stream is being received.

In step 74, playing the first media stream is paused before or during playing the second media stream in the HIDE mode in step 73. The time at which pausing is initiated may take into account a relative desirability, or lack thereof, for pausing the first media stream at different timecodes in the video. For example, if the video is of a football game and the first media stream is displaying an attempted a field goal, it would be relatively undesirable to pause the media stream when the foot of the field goal kicker makes contact with the football and it would be far more desirable to pause the first media stream about five seconds later after the outcome of the attempted field goal has been determined and communicated.

Thus in one embodiment, a pausing rank is associated with each timecode in the first and second media streams. The pausing rank denotes a relative rank to pause playing the first media stream, wherein the method comprises constraining the pausing to occur at a timecode in the first media stream at which the associated pausing rank is not less than a predesignated pausing rank threshold. For example given a predesignated pausing rank threshold of 5, if successive timecodes T1, T2, T3, T4, and T5 in the first media stream have pausing ranks of 8, 3, 5, 6, and 2, respectively, and if the second media stream can be logically paused at any timecode after T1, then the second media streams would be paused at the timecode T3 because T2=3 is less than the pausing rank threshold of 5 and T3=5 is not less than the pausing rank threshold of 5.

The pausing rank associated with each timecode may be recorded as data stored in the memory 22 and/or be embedded with the media streams.

In step 75, after having paused the first media stream in step 74 and at a real time corresponding to a matching timecode (within a specified tolerance) in the first and second media stream, a transition is implemented from playing the second media stream in the HIDE mode to playing the second media stream in the SHOW mode. The paused first media stream is stopped from being paused and from being played at about this real time.

Figure 8:
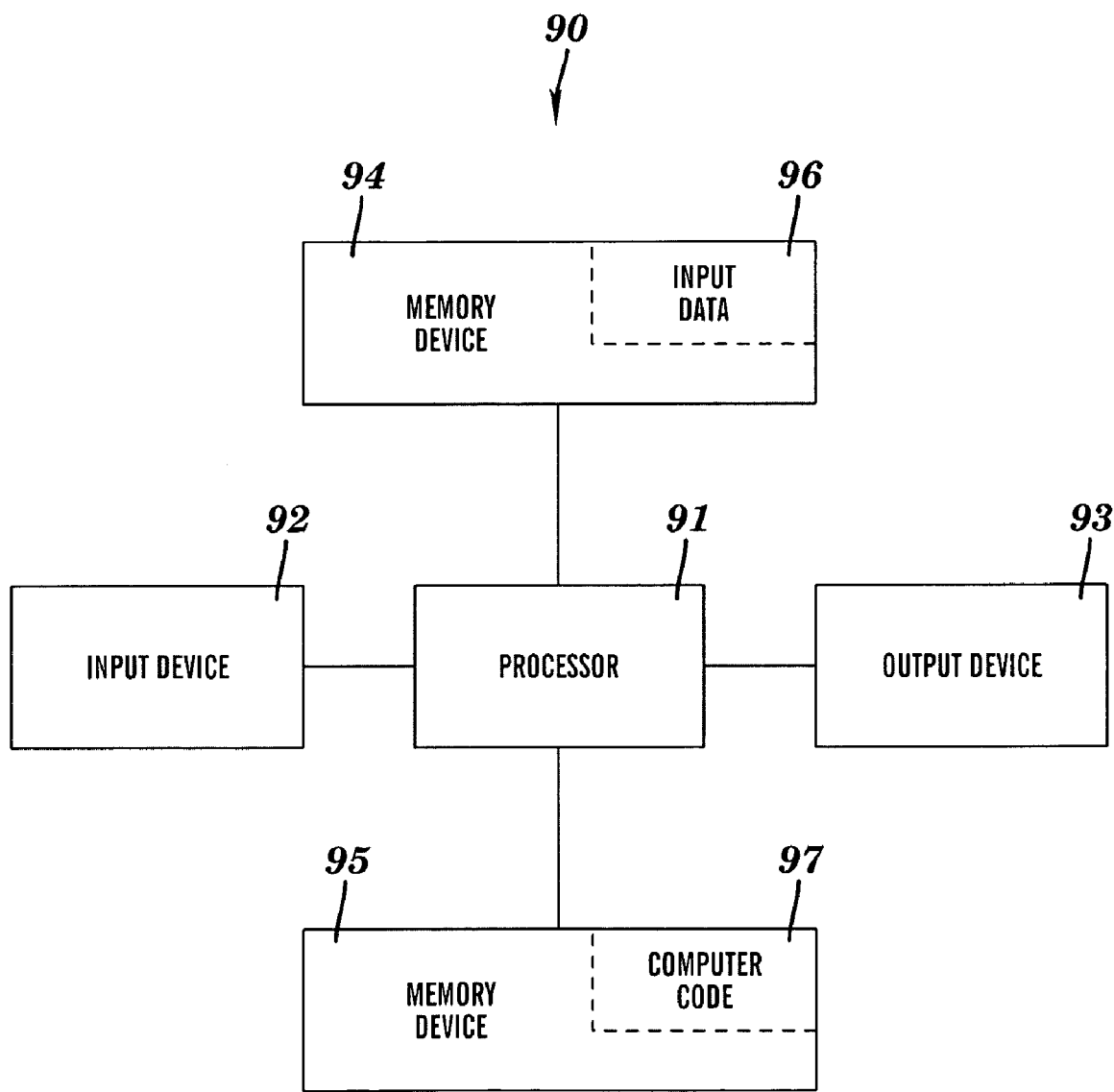
FIG. 8 illustrates a computer system used for switching media streams of a video in a client system, in accordance with embodiments of the present invention.

FIG. 8 illustrates a computer system 90 used for switching media streams of a video in a client system, in accordance with embodiments of the present invention. The computer system 90 may comprise the client system 20 of FIG. 1. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may comprise the display 24 of FIG. 1 and additionally include, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. Either or both of the memory devices 94 and 95 may comprise the memory 22 of FIG. 1. The memory device 95 includes a computer code 97 which is a computer program that comprises computer-executable instructions. The computer code 97 may comprise the media application 21 of FIG. 1 and includes an algorithm for switching media streams of a video in the client system. The processor 91 executes the computer code 97 and may represent the processor 23 of FIG. 1. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer readable storage medium having a computer readable program store therein and/or having other data stored therein, wherein the computer readable program comprises the computer code 97. Generally, a computer program product (or, alternatively, an article of manufacture) of the computer system 90 may comprise said computer readable storage medium.

Thus the present invention discloses a process for supporting computer infrastructure, integrating, hosting, maintaining, and deploying computer-readable code into the computer system 90, wherein the code in combination with the computer system 90 is capable of performing a method for switching media streams of a video in a client system.

Any of the components of the present invention could be created, integrated, hosted, maintained, deployed, managed, serviced, supported, etc. by a service provider who offers to facilitate switching media streams of a video in a client system. Thus the present invention discloses a process for deploying or integrating computing infrastructure, comprising integrating computer-readable code into the computer system 90, wherein the code in combination with the computer system 90 is capable of performing a method for switching media streams of a video in a client system.

In another embodiment, the invention provides a business method that performs the process steps of the invention on a subscription, advertising, and/or fee basis. That is, a service provider, such as a Solution Integrator, could offer to facilitate switching media streams of a video in a client system. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for switching media streams of a video in a client system, said media streams being made available to the client system by a content providing system, said method comprising:

a processor of a computer system receiving a first media stream of the video from the content providing system;

said processor playing the first media stream in a SHOW mode in the client system as the first media stream is being received;

during said playing the first media stream, said processor receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, said processor executing the procedure;

said processor deciding from said executing the procedure to make the switch;

after said deciding, said processor switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by said processor executing a media application in the client system, wherein timecodes identifying relative time within the video are distributed in the first media stream and the second media stream, and wherein said switching comprises:

requesting the second media stream from the content providing system;

after said requesting, receiving the second media stream from the content providing system such that the first and second media streams are being received concurrently with respect to their respective content;

playing the second media stream in a HIDE mode in the client system while the second media stream is being received and while said playing the first media stream in the SHOW mode is being performed; and at a real time corresponding to a matching timecode within a specified tolerance, in the first and second media stream, transitioning from playing the second media stream in the HIDE mode to playing the second media stream in the SHOW mode and stopping said playing the first media stream.

2. The method of claim 1, wherein the command indicates that a necessary condition for the client system to make the switch is that the client system is within any geographical area of a predesignated at least one geographical area, and wherein said executing the procedure comprises determining that the client system is within a geographical area of the predesignated at least one geographical area.

3. The method of claim 1, wherein the command indicates that a necessary condition for the client system to make the switch is a client identifier (ID) that identifies the client system is a member of a pre-specified group of client identifiers, and wherein said executing the procedure comprises determining that the client ID is a member of the pre-specified group of client identifiers.

4. A method for switching media streams of a video in a client system, said media streams being made available to the client system by a content providing system, said method comprising:

a processor of a computer system receiving a first media stream of the video from the content providing system;

said processor playing the first media stream in a SHOW mode in the client system as the first media stream is being received;

during said playing the first media stream, said processor receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, said processor executing the procedure;

said processor deciding from said executing the procedure to make the switch;

after said deciding, said processor switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by said processor executing a media application in the client system, wherein timecodes identifying relative time within the video are distributed in the first media stream and the second media stream, and wherein said switching comprises:

requesting the second media stream from the content providing system;

after said requesting, receiving the second media stream from the content providing system such that the second media stream is lagging the first media stream with respect to their respective content;

playing the received second media stream in a HIDE mode in the client system while the second media stream is being received;

before or during said playing the second media stream in the HIDE mode, pausing said playing the first media stream; and after said pausing and at a real time corresponding to a matching timecode within a specified tolerance, in the first and second media stream, transitioning from playing the second media stream in the HIDE mode to playing the second media stream in the SHOW mode and stopping the first media stream from being paused and from being played.

5. The method of claim 4, wherein a pausing rank is associated with each timecode in the first and second media streams and denotes a relative rank to pause said playing the first media stream, wherein the method comprises constraining said pausing to occur at a timecode in the first media stream at which the associated pausing rank is not less than a predesignated pausing rank threshold, and wherein said constraining said pausing is performed by the media application.

6. A process for supporting computer infrastructure, said process comprising providing at least one support service for at least one of creating, integrating, hosting, maintaining, and deploying computer-readable code in a computing system, wherein the code in combination with the computing system is configured to perform a method for switching media streams of a video in a client system comprised by the computing system, said media streams being made available to the client system by a content providing system, said method comprising:

a processor of a computer system receiving a first media stream of the video from the content providing system;

said processor playing the first media stream in a SHOW mode in the client system as the first media stream is being received;

during said playing the first media stream, said processor receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, said processor executing the procedure;

said processor deciding from said executing the procedure to make the switch;

after said deciding, said processor switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by said processor executing a media application in the client system, wherein timecodes identifying relative time within the video are distributed in the first media stream and the second media stream, and wherein said switching comprises:

requesting the second media stream from the content providing system;

after said requesting, receiving the second media stream from the content providing system such that the second media stream is lagging the first media stream with respect to their respective content;

playing the received second media stream in a HIDE mode in the client system while the second media stream is being received;

before or during said playing the second media stream in the HIDE mode, pausing said playing the first media stream; and after said pausing and at a real time corresponding to a matching timecode within a specified tolerance, in the first and second media stream, transitioning from playing the second media stream in the HIDE mode to playing the second media stream in the SHOW mode and stopping the first media stream from being paused and from being played.

7. The process of claim 6, wherein a pausing rank is associated with each timecode in the first and second media streams and denotes a relative rank to pause said playing the first media stream, wherein the method comprises constraining said pausing to occur at a timecode in the first media stream at which the associated pausing rank is not less than a predesignated pausing rank threshold, and wherein said constraining said pausing is performed by the media application.

8. The process of claim 6, wherein the command indicates that a necessary condition for the client system to make the switch is that the client system is within any geographical area of a predesignated at least one geographical area, and wherein said executing the procedure comprises determining that the client system is within a geographical area of the predesignated at least one geographical area.

9. The process of claim 6, wherein the command indicates that a necessary condition for the client system to make the switch is a client identifier (ID) that identifies the client system is a member of a pre-specified group of client identifiers, and wherein said executing the procedure comprises determining that the client ID is a member of the pre-specified group of client identifiers.

10. A process for supporting computer infrastructure, said process comprising providing at least one support service for at least one of creating, integrating, hosting, maintaining, and deploying computer-readable code in a computing system, wherein the code in combination with the computing system is configured to perform a method for switching media streams of a video in a client system comprised by the computing system, said media streams being made available to the client system by a content providing system, said method comprising:

a processor of a computer system receiving a first media stream of the video from the content providing system;

said processor playing the first media stream in a SHOW mode in the client system as the first media stream is being received;

during said playing the first media stream, said processor receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, said processor executing the procedure;

said processor deciding from said executing the procedure to make the switch;

after said deciding, said processor switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by said processor executing a media application in the client system, wherein timecodes identifying relative time within the video are distributed in the first media stream and the second media stream, and wherein said switching comprises:

requesting the second media stream from the content providing system;

after said requesting, receiving the second media stream from the content providing system such that the first and second media streams are being received concurrently with respect to their respective content;

playing the second media stream in a HIDE mode in the client system while the second media stream is being received and while said playing the first media stream in the SHOW mode is being performed; and at a real time corresponding to a matching timecode within a specified tolerance, in the first and second media stream, transitioning from playing the second media stream in the HIDE mode to playing the second media stream in the SHOW mode and stopping said playing the first media stream.

11. A computer program product, comprising a computer readable storage medium having a computer readable program code stored therein, said computer readable program code containing instructions that when executed by a processor of a computer system implement a method for switching media streams of a video in a client system comprised by the computer system, said media streams being made available to the client system by a content providing system, said method comprising:

receiving a first media stream of the video from the content providing system;

playing the first media stream in a SHOW mode in the client system as the first media stream is being received;

during said playing the first media stream, receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, executing the procedure; deciding from said executing the procedure to make the switch;

after said deciding, switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by a media application in the client system, wherein timecodes identifying relative time within the video are distributed in the first media stream and the second media stream, and wherein said switching comprises:

requesting the second media stream from the content providing system;

after said requesting, receiving the second media stream from the content providing system such that the first and second media streams are being received concurrently with respect to their respective content;

playing the second media stream in a HIDE mode in the client system while the second media stream is being received and while said playing the first media stream in the SHOW mode is being performed; and at a real time corresponding to a matching timecode within a specified tolerance, in the first and second media stream, transitioning from playing the second media stream in the HIDE mode to playing the second media stream in the SHOW mode and stopping said playing the first media stream.

12. The computer program product of claim 11, wherein the command indicates that a necessary condition for the client system to make the switch is that the client system is within any geographical area of a predesignated at least one geographical area, and wherein said executing the procedure comprises determining that the client system is within a geographical area of the predesignated at least one geographical area.

13. The computer program product of claim 11, wherein the command indicates that a necessary condition for the client system to make the switch is a client identifier (ID) that identifies the client system is a member of a pre-specified group of client identifiers, and wherein said executing the procedure comprises determining that the client ID is a member of the pre-specified group of client identifiers.

14. A computer program product, comprising a computer readable storage medium having a computer readable program code stored therein, said computer readable program code containing instructions that when executed by a processor of a computer system implement a method for switching media streams of a video in a client system comprised by the computer system, said media streams being made available to the client system by a content providing system, said method comprising:

receiving a first media stream of the video from the content providing system;

playing the first media stream in a SHOW mode in the client system as the first media stream is being received;

during said playing the first media stream, receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, executing the procedure; deciding from said executing the procedure to make the switch;

after said deciding, switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by a media application in the client system, wherein timecodes identifying relative time within the video are distributed in the first media stream and the second media stream, and wherein said switching comprises:

requesting the second media stream from the content providing system;

after said requesting, receiving the second media stream from the content providing system such that the second media stream is lagging the first media stream with respect to their respective content;

playing the received second media stream in a HIDE mode in the client system while the second media stream is being received;

before or during said playing the second media stream in the HIDE mode, pausing said playing the first media stream; and after said pausing and at a real time corresponding to a matching timecode within a specified tolerance, in the first and second media stream, transitioning from playing the second media stream in the HIDE mode to playing the second media stream in the SHOW mode and stopping the first media stream from being paused and from being played.

15. The computer program product of claim 14, wherein a pausing rank is associated with each timecode in the first and second media streams and denotes a relative rank to pause said playing the first media stream, wherein the method comprises constraining said pausing to occur at a timecode in the first media stream at which the associated pausing rank is not less than a predesignated pausing rank threshold, and wherein said constraining said pausing is performed by the media application.

16. A computer system comprising a processor and a computer readable memory unit coupled to the processor, said memory unit containing instructions that when executed by the processor implement a method for switching media streams of a video in a client system comprised by the computing system, said media streams being made available to the client system by a content providing system, said method comprising:

receiving a first media stream of the video from the content providing system;

playing the first media stream in a SHOW mode in the client system as the first media stream is being received;

during said playing the first media stream, receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, executing the procedure; deciding from said executing the procedure to make the switch;

after said deciding, switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by a media application in the client system, wherein timecodes identifying relative time within the video are distributed in the first media stream and the second media stream, and wherein said switching comprises:

requesting the second media stream from the content providing system;

after said requesting, receiving the second media stream from the content providing system such that the second media stream is lagging the first media stream with respect to their respective content;

playing the received second media stream in a HIDE mode in the client system while the second media stream is being received;

before or during said playing the second media stream in the HIDE mode, pausing said playing the first media stream; and after said pausing and at a real time corresponding to a matching timecode within a specified tolerance, in the first and second media stream, transitioning from playing the second media stream in the HIDE mode to playing the second media stream in the SHOW mode and stopping the first media stream from being paused and from being played.

17. The computer system of claim 16, wherein a pausing rank is associated with each timecode in the first and second media streams and denotes a relative rank to pause said playing the first media stream, wherein the method comprises constraining said pausing to occur at a timecode in the first media stream at which the associated pausing rank is not less than a predesignated pausing rank threshold, and wherein said constraining said pausing is performed by the media application.

18. The computer system of claim 16, wherein the command indicates that a necessary condition for the client system to make the switch is that the client system is within any geographical area of a predesignated at least one geographical area, and wherein said executing the procedure comprises determining that the client system is within a geographical area of the predesignated at least one geographical area.

19. The computer system of claim 16, wherein the command indicates that a necessary condition for the client system to make the switch is a client identifier (ID) that identifies the client system is a member of a pre-specified group of client identifiers, and wherein said executing the procedure comprises determining that the client ID is a member of the pre-specified group of client identifiers.

20. A computer system comprising a processor and a computer readable memory unit coupled to the processor, said memory unit containing instructions that when executed by the processor implement a method for switching media streams of a video in a client system comprised by the computing system, said media streams being made available to the client system by a content providing system, said method comprising:

receiving a first media stream of the video from the content providing system;

playing the first media stream in a SHOW mode in the client system as the first media stream is being received;

during said playing the first media stream, receiving a command from a control system to activate executing a procedure for deciding whether to make a switch from playing the first media stream to playing a second media stream of the video, said command identifying the second media stream which has a different media stream bandwidth than the first media stream;

responsive to said receiving the command, executing the procedure;

deciding from said executing the procedure to make the switch;

after said deciding, switching from playing the first media stream to playing the second media stream in the SHOW mode as the second media stream is being received from the content providing system in response having been requested from the content providing system, said switching preserving content continuity of the video, wherein said receiving the first media stream, said playing the first media stream, said receiving the command, said executing the procedure, said deciding, and said switching are performed by a media application in the client system, wherein timecodes identifying relative time within the video are distributed in the first media stream and the second media stream, and wherein said switching comprises:

requesting the second media stream from the content providing system;

after said requesting, receiving the second media stream from the content providing system such that the first and second media streams are being received concurrently with respect to their respective content;

playing the second media stream in a HIDE mode in the client system while the second media stream is being received and while said playing the first media stream in the SHOW mode is being performed; and at a real time corresponding to a matching timecode within a specified tolerance, in the first and second media stream, transitioning from playing the second media stream in the HIDE mode to playing the second media stream in the SHOW mode and stopping said playing the first media stream.

* * * * *